(12) United States Patent
Mohammed et al.

(10) Patent No.: US 10,852,545 B2
(45) Date of Patent: Dec. 1, 2020

(54) HEAD MOUNTED VIEWER FOR AR AND VR SCENES

(71) Applicant: Xcelsis Corporation, San Jose, CA (US)

(72) Inventors: Ilyas Mohammed, Santa Clara, CA (US); Rajesh Katkar, Milpitas, CA (US); Belgacem Haba, Saratoga, CA (US)

(73) Assignee: Xcelsis Corporation, San Jose, CA (US)

( * ) Notice: Subject to any disclaimer, the term of this patent is extended or adjusted under 35 U.S.C. 154(b) by 141 days.

(21) Appl. No.: 16/124,490

(22) Filed: Sep. 7, 2018

(65) Prior Publication Data

US 2020/0081250 A1  Mar. 12, 2020

(51) Int. Cl.
*G02B 27/01* (2006.01)

(52) U.S. Cl.
CPC .. *G02B 27/0172* (2013.01); *G02B 2027/0118* (2013.01); *G02B 2027/0178* (2013.01)

(58) Field of Classification Search
CPC combination set(s) only.
See application file for complete search history.

(56) References Cited

U.S. PATENT DOCUMENTS

| 5,394,517 | A | 2/1995 | Kalawsky |
| 7,475,985 | B2 | 1/2009 | Blum et al. |
| 9,429,771 | B2 | 8/2016 | Kim et al. |
| 10,522,106 | B2 * | 12/2019 | Hazra ............... G02B 27/0172 |
| 2012/0133891 | A1 | 5/2012 | Jiang |
| 2013/0162673 | A1 | 6/2013 | Bohn |
| 2015/0005604 | A1 | 1/2015 | Biederman et al. |
| 2016/0091737 | A1 | 3/2016 | Kim et al. |
| 2017/0068134 | A1 | 3/2017 | Yadin et al. |
| 2017/0119311 | A1 | 5/2017 | Iwasaki et al. |
| 2017/0160440 | A1 | 6/2017 | Yadin et al. |
| 2017/0196490 | A1 | 7/2017 | Yajima et al. |
| 2017/0323615 | A1 * | 11/2017 | Hazra ..................... G06T 11/60 |

FOREIGN PATENT DOCUMENTS

| KR | 10-2016-0037008 A | 4/2016 |
| WO | 2006/022346 A1 | 3/2006 |

OTHER PUBLICATIONS

LG, "Clear Transparent and True Color Expression" advertisement with product specifications, 2015, 2 pages.
Sato, "Liquid Crystal Lens for Focusing and Zooming Systems", 2 pages.
Sato "Liquid-Crystal Lens-Cells with Variable Focal Length", Japanese Journal of Applied Physics, vol. 18, No. 9, Sep. 2, 1979, pp. 1679-1684.
Lee, et al. "7.2: Tandem OLED and Reflective LCD with a Microlens Array, SID Symposium Digest of Technical Papers", Jun. 2006, pp. 68-70.
Zhu, et al., "Transflective Liquid Crystal Displays", IEEE/OSA Journal of Display Technology, vol. 1, No. 1, Sep. 2005, pp. 15-29.

* cited by examiner

*Primary Examiner* — Van N Chow
(74) *Attorney, Agent, or Firm* — Lerner David (57) ABSTRACT

An optical device comprising: an image layer including variable transparency pixels and display pixels and a lens layer including variable lens pixels.

15 Claims, 5 Drawing Sheets

HEAD MOUNTED VIEWER FOR AR AND VR SCENES

BACKGROUND

Virtual Reality (VR) and Augmented/Mixed Reality (AR/MR) typically use different technologies to display images. VR headsets generally use non-transparent displays, closed to the outside world. For example, some VR systems use a flat panel display such as a smartphone screen for image projection. AR/MR displays often use transparent smart glasses that may include waveguide optics, refractive optics, bird bath, or pre-compensated off-axis, for example. There is a need for a system and method that can produce both VR and AR/MR.

SUMMARY

In one aspect, an optical device is provided that comprises an image layer including variable transparency pixels and display pixels and includes a lens layer that includes variable lens pixels.

In another aspect, an optical device is provided that comprises a variable transparency image layer and a lens layer. A control circuit is configurable to provide signals to adjust a transparency level of at least a portion of the variable transparency image layer by at least 5 percent. The control circuit configurable to provide signals to adjust a refractive index of at least a portion of the lens layer by at least 5 percent.

In another aspect an optical device is provided that includes an image layer including variable transparency pixels and display pixels and includes a lens layer including variable lens pixels. A controller may be configured by instructions to individually control light display by display pixels and to control refractive indexes of individual lens pixels.

DESCRIPTION OF EMBODIMENTS

Figure 1:
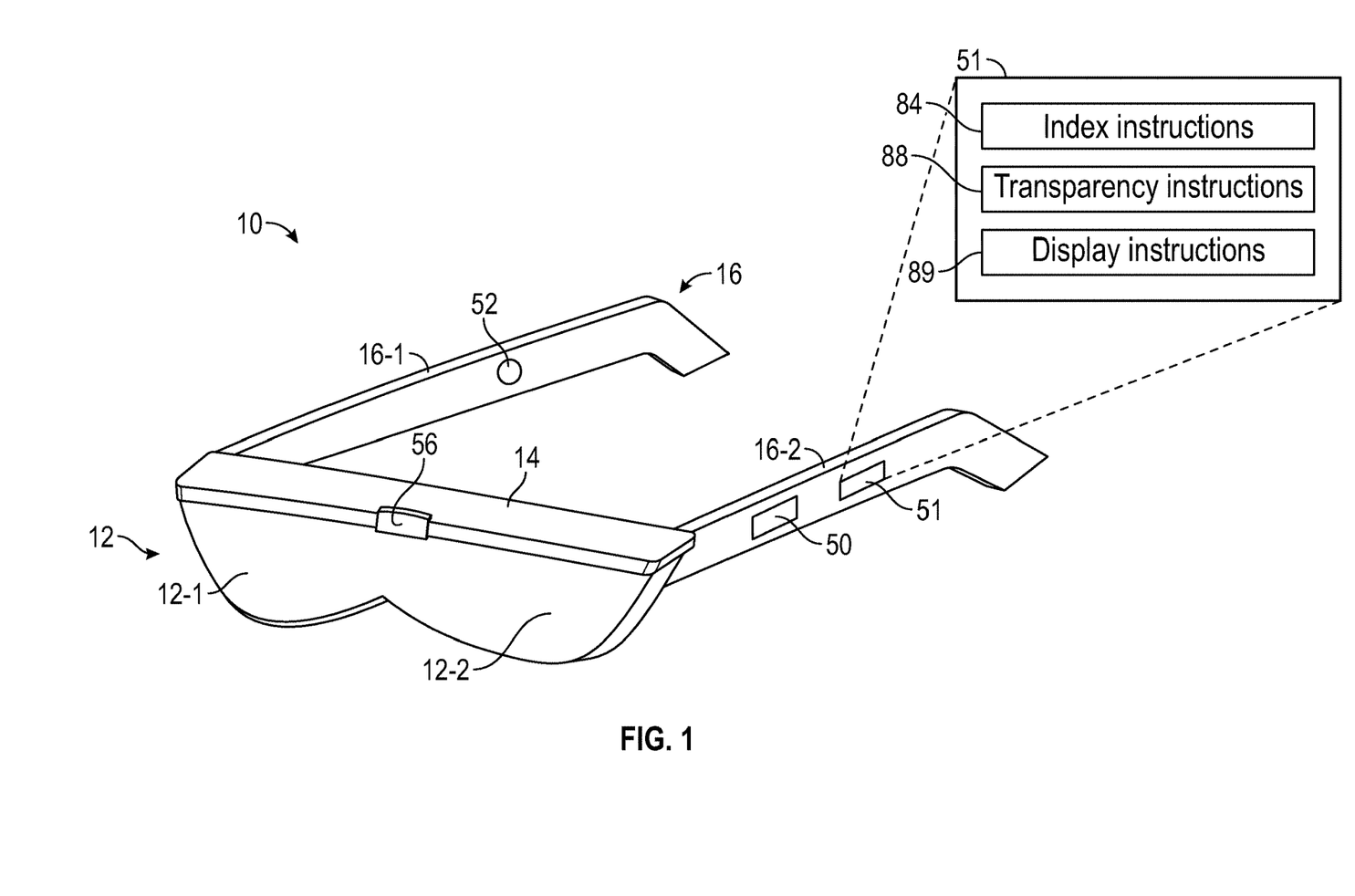
FIG. 1 is an illustrative perspective view of a head mounted optical viewer device that includes a lens unit, a frame unit and a leg unit.

FIG. 1 is an illustrative perspective view of a head mounted optical viewer device 10 that includes a viewer unit 12, a frame unit 14 and a leg unit 16. The viewer unit includes left and right optical viewing regions 12-1, 12-2. The viewer unit 12 is mounted within the frame unit 14. In some embodiments, the viewer unit 12 may include integral left and right viewing pieces 12-1, 12-2. In other embodiments, the viewer unit 12 may include separate left and right viewing pieces (not shown). The leg unit 16 includes a pair of legs, a right leg 16-1 and a left leg 16-2, connected to the right and left sides of the frame unit, respectively, to extend along opposite sides of a user's head.

Figure 2A:
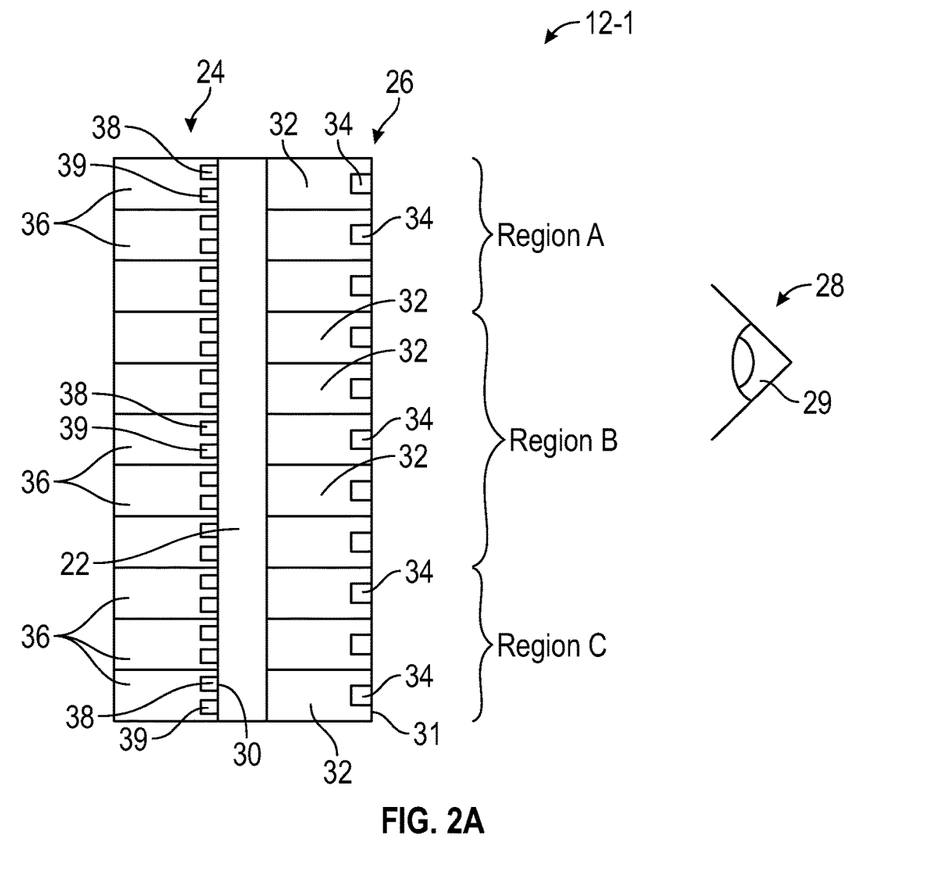
FIG. 2A is an illustrative cross section view of a viewing region that includes a transparent glass or plastic substrate, a variable transparency image layer, and an adaptive lens layer.

FIG. 2A is an illustrative cross section view of a viewing region 12-1 that includes a transparent glass or transparent plastic substrate 22, a variable transparency image layer 24, and an adaptive lens layer 26. The image layer 24 and the lens layer 26 are disposed upon the substrate layer 22. The image layer 24 includes variable transparency pixels 38 (also referred to herein as "transparency" pixels) to impart selectable transparency to passage of ambient light through a display surface 30, and also include display pixels 39 to produce display images. The lens layer 26 includes lens pixels 34 to selectably produce one or more adaptive lenses at a lens surface 31. In some embodiments, the lens layer 26 is disposed between a user's eye 28 and the image layer 24 with the display surface facing the lens layer 26. In some embodiments, the image display layer 24 and the variable lens layer 26 are disposed in an alignment such that ambient of light may pass between the variable transparency pixels 38 and the variable lens pixels 34 and such that emitted light may pass between the display pixels 39 and variable lens pixels 38. Although, only one lens layer 26 is shown in FIG. 2A, an embodiment may have two or more stacked lens layers stacked. In an alternative embodiment, the image layer 24 may be disposed between a user's eye 28 and one or more lens layer (not shown) with the lens layer display surface facing the one or more lens layers. In some embodiments, a separate substrate 22 may not be included, and instead, each of the image layer 24 or lens layer 26 may act as a substrate for the other layer.

A refractive index of the lens layer 26 may be locally adjusted to focus images created by the image layer 24 at an adjustable viewing distance from the eye 28 of a user wearing the viewer 12. More particularly, the index of refraction at one or more local regions of the lens layer 26 may be adjusted to have indexes of refraction varied to foveate an image by improving focus of objects perceived at these local lens regions. As explained more fully below, different lens pixels 34 may be adjusted to have different indexes of refraction in a pattern to impart a local lens function. In some embodiments, a refractive index of lens pixels 34 of one local region A of the lens layer 26 may be adjusted to differ by more than five percent compared to the refractive index of lens pixels 34 of another local region B of the lens layer 26, which may be adjusted to differ by more than five percent compared to lens pixels 34 the refractive index of another local region C, and so on. For example, refractive index of lens pixels 34 of local region A may be adjusted to be 1.4, the refractive index of local region B may be adjusted to be 2.0 and the refractive index of lens pixels 34 of local region C may be adjusted to be 3.0. The local regions with lens pixels these different refractive indices may be adjusted to be square or rectangular or any other shapes and sizes. They may also be adjusted to be concentric rings of lens pixels 34 with gradually increasing or decreasing refractive indices moving from a center to an edge of the local region effectively creating a large lens with a specific focal length. In another embodiment, a rectangular or square patterns or concentric ring patterns (or any other shape) of lens pixels 34 may be selected to have varying indexes of refraction to define one or more local regions within the lens layer 26 that perform a lens function, effectively creating varying focal length at one area of layer 26 compared to focal length of another area of layer 26. It will be appreciated that varying focal lengths in multiple different regions of the lens layer 26 may create three-dimensional (not just planar) images.

Transparency of the transparency pixels 38 of the image layer 24 may be adjusted between transparent, partially transparent (shaded), and non-transparent (opaque) modes. More particularly, transparency pixels 38 of local regions of the transparency layer may be adjusted to have different transparency levels such that one local region may have a transparency level that differs from that of an outer local region. As used herein, "transparency level" is measured as the percent of outside light allowed to filter In via each pixel. As explained more fully below, transparency pixels 38 of the image layer 30 may be selectably adjusted to be transparent with no dimming of light passing through them such that ambient real-world light is fully visible through such transparent transparency pixels 38 to a user wearing the viewer 12. Transparency pixels 38 of the image layer 30 may be selectably adjusted to be partially transparent (shaded) to partially block passage of ambient light through them, resulting in dimming or shading of ambient real-world images visible through the image layer 24. In some embodiments, transparency of transparency pixels 38 of the image layer 24 may be adjusted to a partially transparent shaded level in which a transparency of the image layer is reduced to a level in a range between five percent and ninety-five percent. In some embodiments, for example, transparency level of transparency pixels 38 local region A may be adjusted to differ from the transparency level of transparency pixels 38 of local region B by more than five percent, which in turn, may be adjusted to differ by more than 5 percent compared to the transparency level of transparency pixels 38 of another local region C. For example, transparency level of one local region may be adjusted to be five percent, and the transparency level of another local region may be adjusted to be ninety-five percent. In another example, the transparency level of one local region may adjusted to be one-hundred percent, i.e. fully transparent, while the transparency level of some other region may be adjusted to be zero percent, i.e. fully opaque. In some embodiments, for example, some regions (one or more transparency pixels 38) of the image layer 24 may be adjusted to be fully transparent, others may be adjusted to be partially transparent, while others may be adjusted to be completely opaque. The local regions with these different transparency levels may be square or rectangular or any other shapes and size. The minimum size of the local region may be display pixel-sized, such as, 5 um×5 um, for example. Shading may enhance lighting contrast between a user's view of images produced by the image layer 24 and the user's view of the ambient world visible through shaded partially transparent image layer 24. Thus, shading may result in visually sharper display images. In the non-transparent opaque mode, the image layer 24 blocks out light preventing images from the ambient real-world from reaching the eyes 28 of a user wearing the viewer 12. In the opaque mode, some regions of the image layer 24 may produce images while the lens layer 26 focuses the images at focal plane at an adjustable viewing distance from the user.

Light emission by of display pixels 39 of the image layer 24 may be selectably adjusted to produce display images. More particularly, display pixels 39 within the transparency layer may be adjusted to emit light in patterns to produce a visual image. Transparency of one or more transparency pixels 38 may be selectably adjusted to increase contrast of the displayed image to make it more visible. Indexes of refraction of corresponding lens pixels 34 may be adjusted to adjust a focal plane of the image to the focal plane of a user's eye gaze. Moreover, the indexes of refraction of lens pixels 34 of the lens layer 26 may be selectably adjusted to create different focal planes for different portions of a display image so as to create a three-dimensional effect.

More particularly, the lens layer 26 includes an arrangement of electrically adjustable optical devices 32 that include individual lens pixels 34 configured to provide a distribution of local phase shifts at lens pixel locations to dynamically adjust the index of refraction within the lens layer 26. In some embodiments, the optical devices 32 within the lens layer 26 may include liquid crystal display (LCD) devices or a thin film transistor (TFT) LCD devices in which local lens pixels 34 are electrically tunable to achieve a locally adjustable phase profile. As used herein, the term phase modulation profile refers to distribution of local phase shifts applied to light passing through the lens layer 26 as the result of local variation of the effective refractive index over an adjustable local area of the lens layer 26.

The image layer 24 includes an arrangement of electrically adjustable devices 36 disposed upon the substrate 22 within a user's field of view, which include display pixels 39 to selectably produce display images and selectable transparency pixels 38 that are controllable to adjustably pass or block the passage of light as explained above. In some embodiments, the the image layer 24 may include light emitting devices such as at least one of an electroluminescent (EL) image layer, a vacuum fluorescent image layer, a plasma display panel layer, a LCD layer, a TFT LCD layer, and an organic light-emitting diode (OLED) image layer. However, the image layer 24 is not limited thereto, and any arrangement of electrically adjustable devices that may configure display and adjustable transparency characteristics of the image layer. To improve viewing experience, very bright images may be projected by the image layer 24 in a brightly lit viewing environmental surrounding, while less bright images may be projected, in a dimly lit viewing environment, for example. Thus, controlled transparency of the image layer may effectively control the surrounding lighting condition reaching the viewers eye, and hence the amount of power needed by the light emitting devices of the image layer 24.

Figure 2B:
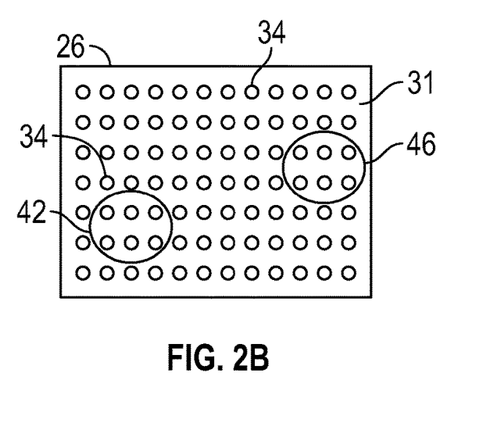
FIG. 2B is an illustrative front elevation view of a surface of the lens layer facing a user's eye in FIG. 2A.
Figure 2C:
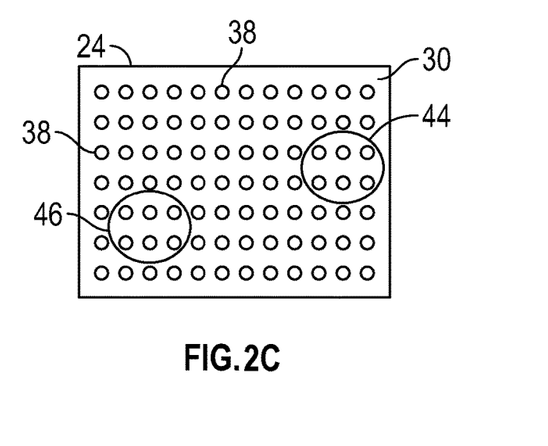
FIG. 2C is an illustrative front elevation view of a surface of the image layer facing a user's eye in FIG. 2A.

FIG. 2B is an illustrative front elevation view of a surface 31 of the lens layer 26 facing a user's eye in FIG. 2A. Referring to FIGS. 2A and 2B, the lens layer surface 31 includes a two-dimensional arrangement of lens pixels 34 that face toward the user's eye 28. Example first local lens region 40 and second local lens region 42 are shown that each encompasses a different group of lens pixels 34. As used herein a "local lens region" refers to one or more lens pixels 34 caused by control signals provided by the controller 50 to share a common refractive index. FIG. 2C is an illustrative front elevation view of a surface 30 of the image layer 24 facing a user's eye in FIG. 2A. Referring to FIGS. 2A and 2C, the image layer surface 30 includes a two-dimensional arrangement of transparency pixels 38 and display pixels 39 (labeled jointly as 38/39) that face toward the user's eye 28. Example first local display region 44 and second local display region 46 are shown that each encompasses a different group of transparency/display pixels 38/39. The first and second local display regions 44, 46 each includes multiple adjacent transparency/display pixels 38/39 with display light emissions and transparencies that may be adjusted to be less transparent than other regions of the image layer 24. As used herein a "local display region" refers to one or more transparency/display pixels 38/39 caused by control signals provided by the controller 50 to share a common transparency level. Moreover, transparency/display pixels 38/39 within the first and second local display regions 44, 46 may produce display images such as text or pictures. Referring to FIGS. 2B-2C, the first and second local lens regions 40, 42 each includes multiple adjacent lens pixels 34 with refractive indexes that may be adjusted to differ by amounts to cause them collectively to act as first and second lenses that adjust focal planes of ambient images and display images produced within corresponding example local display regions 44, 46 of the image layer 24 that may be visually aligned with the example local lens regions 40, 42. As used herein, "visually aligned" refers to an alignment of two or more elements such that a ray of light passing through all of the visually aligned elements is incident upon a user's eye.

Referring again to FIG. 1, optical properties of the variable transparency image layer 24 and an adaptive lens layer 26 are controlled by a controller 50, powered by a battery 52 or other power source. In some embodiments, the controller 50 may include a processor circuit with hard-wired and/or programmable logic components and suitable interfaces for carrying out the functions that are described herein. In some embodiments, the controller 50 may include an ASIC or other logic device to handle certain functions. These and other control elements of the viewer 12 may be mounted on or in the viewer legs 16-1, 16-2 or frame 14 or may alternatively may be contained in a separate unit (not shown) connected by wire to the frame or legs.

A memory storage device 51 such as DRAM, Flash, PROM, EPROM, or magnetic or optical storage or other hardware storage media, stores machine/computer readable instructions to dynamically configure the control circuit to produce signals to selectably control refractive indexes of individual lens pixels 34, to selectably control levels of the variable transparency pixels 38, and to selectably control light emission of individual display pixels 39. Index of refraction instructions 84 stored within the storage device 51 may configure the controller 50 to produce signals to adjust the refractive indexes of one or more lens pixels 34. Transparency instructions 88 within the storage device 51 may configure the controller 50 to produce signals to adjust transparency level of the image layer 24. Display instructions 89 within the storage device 51 may configure the controller 50 to produce signals to selectably determine light emission by display pixels 39 of the image layer 24.

In some embodiments, the viewer 12 includes one or more sensors 56, which sense the distance from the eye of the user wearing the viewer to a real-world object viewed by the user. The index of refraction instructions 84 may configure the controller 50 to produce signals to adjust the refractive indexes of one or more lens pixels 34 based upon the sensor readings. In some embodiments, the one or more sensors 56 may include an infrared detector to detect distance of an object. from the viewer. In some embodiments, the one or more sensors 56 may include a pair of eye trackers, which detect respective gaze directions of the right and left eyes. In some embodiments, the index of refraction instructions may configure the controller 50 to adjust the lenses to shift the respective optical axes of one or more lens pixels 34 responsively to the sensed gaze directions. Moreover, in some embodiments, the index of refraction instructions may configure the controller 50 to use the distance between the pupils 29 (only one shown), as measured by eye trackers, to estimate a user's focal distance (even without analyzing the actual gaze direction). In some embodiments, the controller 50 causes the sensor to update the estimates of focal distance and gaze direction at least once every thirty seconds.

Figure 3A:
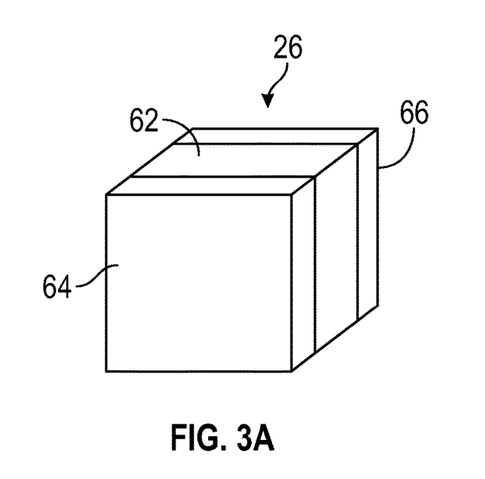
FIGS. 3A-3D are illustrative schematic diagrams showing details of the lens layer in accordance with some embodiments.
Figure 3B:
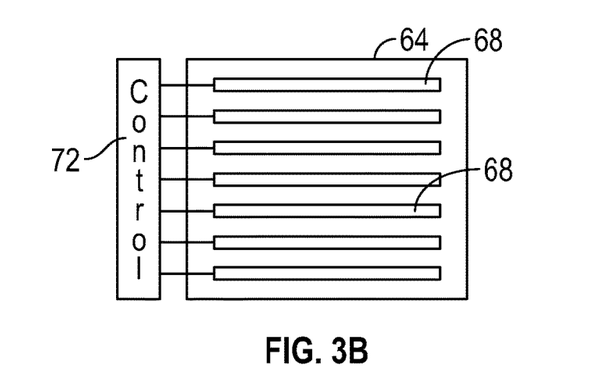
Figure 3C:
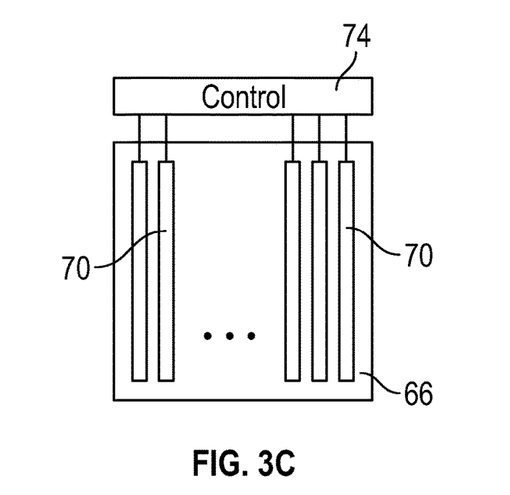
Figure 3D:
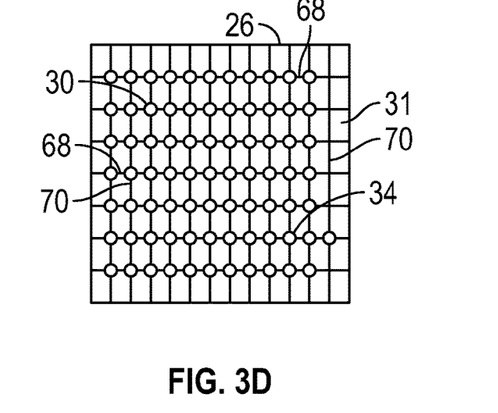

FIGS. 3A-3D are illustrative schematic diagrams showing details of the lens layer 26 in accordance with some embodiments. FIG. 3A is a perspective view of the of the lens layer 26, which includes an electro-optical layer 62 disposed between transparent electrode layers 64, 66 containing orthogonal electrodes 68, 70. In some embodiments, the electro-optical layer 62 may include a liquid-crystal layer that typically refracts light, in response to voltage waveforms applied at the electrodes layers 64, 66 in only one direction of polarization, while the other polarization passes through electro-optical layer 62 without refraction. FIG. 3B and FIG. 3C are side views showing certain details of the opposing transparent electrode layers 64, 66. FIG. 3D is an illustrative view of face 31 of the lens layer 26, showing a superposition of the excitation opposed electrode layers and 64, 66 to produce lens pixels 34 at their points of intersection.

Electrodes 68, 70 disposed within the respective transparent electrode layers 64, 66 include parallel strips of transparent conductive material extending over opposite sides of the electro-optical layer 62 in mutually-orthogonal directions. FIG. 3D shows a superposition of electrodes 68, 70, which creates an array of lens pixels 34, defined by the areas of intersection of the vertical strips of electrodes 70 with the horizontal stripes of electrodes 68.

The control circuits 72, 74 under the control of the processor controller 50, apply control voltages to electrodes 68, 70, respectively. The control circuits 72, 74 may modify the control voltages applied to each of a set of the electrodes 68, 70 simultaneously and independently. The control circuits 72, 74 together may modify the voltages applied to sets of the electrodes 68, 70 on both of the sides of the electro-optical layer 62, thereby adjusting the phase modulation profile at local lens regions (e.g., local lens regions 40, 42) of the lens 26 layer. More specifically, the control voltages applied to electrodes 68, 70 of the lens layer 26 tune the respective focal properties of individual lens pixels 34 in selectable regions of the lens layer 26.

Figure 4A:
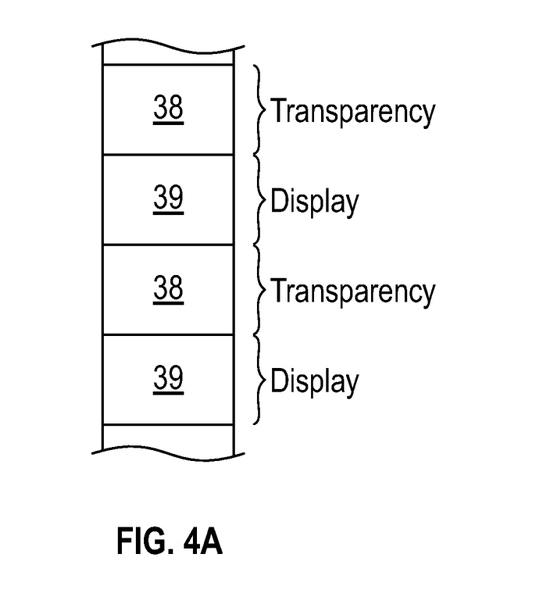
FIG. 4A is an illustrative cross-section view of the image layer in accordance with some embodiments.

FIG. 4A is an illustrative cross-section view of a portion of the image layer 24 in accordance with some embodiments. Display pixels 39 and transparency pixels 38 are disposed in a planar arrangement. The display pixels 39 and transparency pixels 38 are shown disposed adjacent in an alternating pattern. However other arrangements may be used. The display pixels 39 that may include a light emitting display device such as an LED within an LCD layer or an OLED layer, for example. A display pixel 39 itself may be partially transparent or opaque. The variable transparency pixels 38, may include a variable transparency LCD layer or a variable transparency OLED layer, for example. Light may be emitted by the display pixels 39 and ambient light from the surrounding may be transmitted, with selectably variable levels of transparency by the variable transparency pixels 38. Thus, a user may recognize a real-world object visible through the variable transparency pixels 38 where the external light may be transmitted. The display pixels 39 and variable transparency pixels 38 8 may be controlled by control circuits (not shown) and electrodes (not shown) like those used to control the lens layer lens pixels 34.

During operation in the transparent mode, control signals may be applied to individual variable transparency pixels 38 of the image layer 24 to cause them to be transparent to light. In some embodiments, all variable transparency pixels 38 are transparent in the transparent mode. Circuitry (not shown) within the display pixels 39 of individual may have dimensions that are so small and narrow as to be invisible to a user when the transparency pixels 38 of the image layer 24 is in the transparent mode. During operation in the shaded mode, control signals may be applied to individual variable transparency pixels 38 of the image layer 24 to cause some of them to be transparent and to cause some of them to be opaque. Varying the proportion of the variable transparency pixels 38 that are opaque and that are transparent varies the level of shading. A larger number of opaque variable transparency pixels 38 results in less overall transparency and darker shading. In some embodiments, in a shaded mode, the controller 50 causes substantially all of the variable transparency pixels 38 to become opaque. A larger number of transparent variable transparency pixels 38 results in greater overall transparency and lighter shading. During operation in the opaque mode, control signals may be applied to individual variable transparency pixels 38 of the of the image layer 24 to cause them to be opaque to light. In some embodiments, all variable transparency pixels 38 are opaque in the opaque mode.

In the illustrative embodiment of FIG. 4A, display regions 402 and variable transparency pixels 38 are disposed adjacent to each other within a single layer within a pixel 38. In some embodiments, display pixels 39 may be essentially opaque and the transparent behavior of the image layer 24 (full or partial or opaque) is solely governed by the adjacent variable transparency pixels 38. In some embodiments transparency pixels may occupy fifty percent of the display layer and display pixels 39 may occupy fifty percent of display layer 24, for example. In alternative embodiments, display pixels 39 may occupy other percentages of the display layer varying from ten percent to ninety percent and the rest is occupied by variable transparency pixels 38, for example.

Figure 4B:
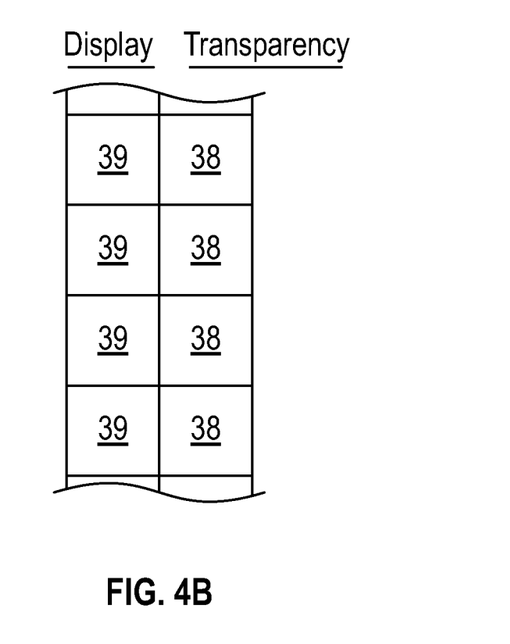
FIG. 4B is an illustrative cross-section view of a portion of the image layer in accordance with alternative embodiments.

FIG. 4B is an illustrative cross-section view of a portion of the image layer 24 in accordance with alternative embodiments. Display pixels 39 and transparency pixels 38 are disposed in a stacked arrangement. The display pixels 39 and transparency pixels 38 are shown disposed overlapping in a user's field of view. In this alternative embodiment the display pixels are at least partially transparent. For example, the display pixels 39 may include partially transparent LCDs (e.g., 70-90 percent transparent). This alternative stacked arrangement may allow passage of additional ambient light in transparent mode of operation; hence providing a better viewing experience.

Figure 5:
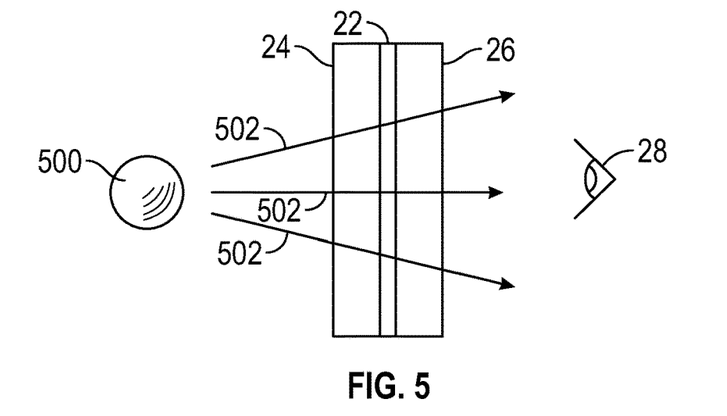
FIG. 5 is a cross-section view representing an example of operation of the substrate, image layer and lens layer in the transparent mode in accordance with some embodiments.

FIG. 5 is a cross-section view representing an example of operation of the substrate 22, image layer 24 and lens layer 26 in the transparent mode in accordance with some embodiments. The index of refraction instructions 84 cause the controller 50 to provide controls signals to cause the lens layer 22 to impart no local phase shifts at lens pixel 34 within the lens layer. The transparency instructions 88 cause the controller 50 to provide control signals to cause the variable transparency pixels 38 within the image layer 24 transmit light without shading at. Thus, ambient light 502 reflected from an external real-world object 500 may pass through the lens layer 26 and the image layer 24 to a user's eye 28, without phase adjustment and without shading.

Figure 6:
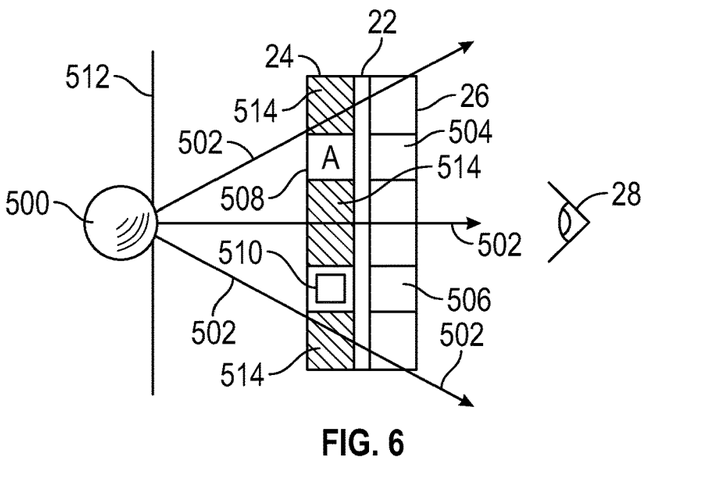
FIG. 6 is a cross-section view representing an example of operation of the substrate, image layer and lens layer in the partially transparent mode in accordance with some embodiments.

FIG. 6 is a cross-section view representing an example of operation of the substrate 22, image layer 24 and lens layer 26 in the partially transparent mode in accordance with some embodiments. The index of refraction instructions 84 cause the controller 50 to provide controls signals to cause the lens layer 26 to impart selected adjustments of refractive indexes to selected lens pixels 34 to impart phase shifts to light passing through the selected lens pixels 34 to dynamically produce two example local lens regions 504, 506 that have respective local phase shift profiles. Meanwhile, the display instructions 89 cause controller 50 to provide control signals to cause selected adjustment of light emission by selected display pixels 39 visually aligned with the local lens regions 504, 506 to dynamically produce two example display images, the letter 'A' 508 and a picture of a square 510, for example. In some embodiments, the index of refraction instructions 84 and the display instructions 89 may cause the controller 50 to select locations of the local display lens regions 504, 506 within the lens layer 26 and to select the corresponding locations of the display pixels 39 with the image layer 24 to emit light to produce the local display images 508, 510 (e.g., 'A' and a square) based upon gaze direction and/or focal distance determined based upon one or more of distance, eye tracking and inter-pupil pupil spacing detected by the one or more sensors. In accordance with some embodiments, the index of refraction instructions 84 cause the controller 50 provide signals to select refractive indexes of lens pixels 34 within the lens layer 26 to produce local phase profiles within the example local lens regions 504, 506 to focus the display images 508, 510 at a focal plane 512 that matches a user's eye focus. In the illustrative example of FIG. 6, the user is gazing at the external object 500. In some embodiments, the processor controller 50 may provide control signals causing updating of the location of the local display/lens regions and the local phase profile at a rate of least thirty times per second or more based upon updated sensor focal point and gaze information.

Still referring to FIG. 6, the transparency instructions 88 may cause the controller 50 to provide control signals to select individual variable transparency pixels 38 within example portions 514 of the image layer 24 to be partially transparent to partially block the ambient light 502. Alternatively, in some embodiments, transparency instructions 88 may cause the controller 50 to provide control signals to select transparency pixel transparency level that completely blocks passage of ambient light 502 within the local display regions 508, 510. Shading of the image layer 24 results in greater light contrast between the display images, produced by light emitting devices within the local display regions 508, 510, and ambient. Greater light contrast may result in improved visibility of the display images to a user.

In some embodiments in the shaded mode, the head mounted viewer 12 may present an augmented reality (AR) scene to a user. While a user observes an ambient, real-world (RW), scene through the variable transparency regions 404 of the image layer 24, the image layer may produce a display image, such as a planar text image or a pictorial image, within a local display region. The lens layer 26 may produce a local phase profile within a local lens region aligned with the local display region to focus the display image at a focal plane that matches a locus of a user's eye focus. Therefore, the user perceives the display image overlaid onto the RW scene.

In some embodiments in the shaded mode, the head mounted viewer 12 may present a mixed reality (MR) scene to a user. With MR, just as with AR, a user observes an ambient, RW, scene through the image layer 24. The image layer 24 produces a display image, such as a three-dimensional (3D) image, within a local display region. The lens layer 26 produces a local phase profile within a local lens region to focus the display image at a focal plane matching a user's eye focus. In addition, the controller 50 may be configured to use information collected by the one or more sensors 56 to identify a RW object within the user's field of view and to attach the display image with the RW object. The controller 50 may be configured to adjust location of a local display region and to adjust the corresponding location the associated local lens region such that the display image appears to the user to be physically located in the RW at the identified object. For example, as a user moves his head such that the viewer changes position in RW 3D space and the relative position of the identified object with respect to the viewer changes, the processor control circuit provides signals to cause the local display region and local lens region to move within the viewer pieces to maintain the appearance, from the user's perspective, that the display image is physically attached to the identified object. Therefore, the user perceives the display image mixed within the RW scene.

Figure 7:
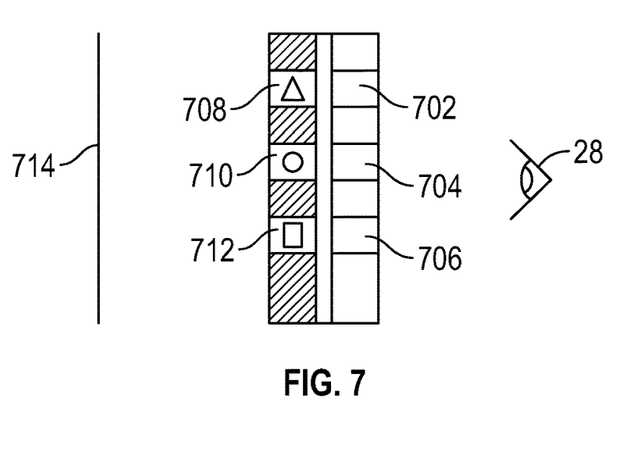
FIG. 7 is a cross-section view representing an example of operation of the substrate, image layer and lens layer in the non-transparent mode in accordance with some embodiments.

FIG. 7 is a cross-section view representing an example of operation of the substrate 22, image layer 24 and lens layer 26 in the non-transparent mode in accordance with some embodiments. The transparency instructions 88 cause the controller 50 to provide control signals to select individual variable transparency pixels 38 to operate in a non-transparent mode in which they block passage of ambient light. The index of refraction instructions 84 cause the controller 50 to provide control signals to adjust the indexes of refraction of selected individual lens pixels 34 of the lens layer 26 to impart local phase shifts to dynamically produce local phase profiles within three example local lens regions 702, 704, 706. Meanwhile, the display instructions 89 cause the controller 50 to provide controls signals to select individual display pixels 39 of the image layer 24 to dynamically emit light to produce three example three-dimensional display images, a triangle, a circle, and a square at three different local display regions 708, 710, 712. Each of the three example local lens regions 702, 704, 706 is visually aligned with one of the example local display regions 708, 710, 712. In some embodiments, the index of refraction instructions 84 may cause the controller 50 to provide signals to individually adjust the refractive indexes of the lens pixels 34 within local lens regions 702, 704, 706 so that different portions of the display images within to produce different local phase shifts for different portions of the local images local display regions 708, 710, 712 have different focal points near a focal plane 714 of a user's eye gaze, to produce a three-dimensional effect.

In some embodiments in the non-transparent mode, the head mounted viewer 12 may present a virtual reality (VR) scene to a user. While a user observes is blocked from viewing the real-world, the image layer 24 may produce 3D images within one or more local display regions as explained above. The lens layer 26 may produce one or more corresponding local phase local lens regions aligned with the local display region to focus the display image at the prescribed focal plane. Therefore, the user perceives the display image within a VR scene.

In some embodiments, the controller 50 may be configured to provide signals to cause the image layer to cycle between a transparent mode in which the image layer 24 is transparent and the non-transparent mode in which the image layer 24 is non-transparent and while producing a display image within at least one local display region. In some embodiments, the cycle rate is fast enough that the display image becomes clearly visibly perceptible. In some embodiments, the cycle rate is at least thirty-frames per second. It will be understood that persistence of vision for human eye is roughly ⅒th of a second. 30 frames per second would provide a solid non-flickering image to the human eye/brain. The one or more sensors 56 may determine a user's focus during the transparent cycles. The controller 50 may be configured to produce signals to cause a local phase profile within a local lens profile region of the lens layer 26 that is aligned with the images produced during the opaque cycle to focus the images at the user's visual focal plane.

In some embodiments, the processor controller 50 may be configured to cause the image layer 24 in one viewer region 12-1, 12-2 to be transparent while causing the image layer in the other viewer region to be non-transparent while producing a display image within at least one local display region.

The above description is presented to enable any person skilled in the art to create and use a head mounted viewer to view augmented reality (AR) or virtual reality (VR) scenes. Various modifications to the embodiments will be readily apparent to those skilled in the art, and the generic principles defined herein may be applied to other embodiments and applications without departing from the spirit and scope of the invention. In the preceding description, numerous details are set forth for the purpose of explanation. However, one of ordinary skill in the art will realize that the embodiments in the disclosure might be practiced without the use of these specific details. In other instances, well-known processes are shown in block diagram form in order not to obscure the description of the invention with unnecessary detail. Identical reference numerals may be used to represent different views of the same or similar item in different drawings. Thus, the foregoing description and drawings of embodiments in accordance with the present invention are merely illustrative of the principles of the invention. Therefore, it will be understood that various modifications can be made to the embodiments by those skilled in the art without departing from the spirit and scope of the invention, which is defined in the appended claims.

The invention claimed is:

1. An optical device comprising:
    a viewing region including an image display layer and a variable lens layer,
        wherein the image display layer includes:
            a plurality of variable transparency pixels that are disposed in a two-dimensional arrangement and that are individually selectably operable to vary transparency to passage of ambient light therethrough, and
            a plurality of display pixels that are disposed in a two-dimensional arrangement and that are individually selectably operable to emit light, and
        wherein the variable lens layer includes
            a plurality of variable lens pixels that are disposed in a two-dimensional arrangement and that are individually operable to impart a variable index of refraction to light incident thereupon; and wherein the image display layer and the variable lens layer are disposed such that ambient light may pass between the variable transparency pixels and the variable lens pixels and such that light may pass between the display pixels and variable lens pixels.

2. The optical device of claim 1 further including:

a control circuit and a non-transitory computer readable medium operably coupled thereto, the non-transitory computer readable medium comprising a plurality of instructions stored in association therewith that are accessible to, and executable by, the control circuit, where the plurality of instructions comprises:

display instructions that, when executed, cause a plurality of display pixels within a local display region within the image display layer to emit light representing an image; and index of refraction instructions that, when executed, select individual indexes of refraction for individual lens pixels of a plurality of lens pixels within a local lens region, to impart to light incident thereupon, emitted by one or more of the display pixels within the local display region.

3. The optical device of claim 2 further including:

a sensor to select the focal plane for the light representing the image.

4. The optical device of claim 2, wherein the display instructions, when executed, cause a plurality of display pixels within a local display region within the image display layer to emit light representing a three-dimensional image; and wherein the index of refraction instructions, when executed, select individual indexes of refraction for the individual lens pixels of the plurality of pixels within the local lens region, to impart to light incident thereupon, emitted by one or more of the display pixels within the local display region to cause the image to have a three-dimensional appearance at the focal plane.

5. The optical device of claim 2 further including:

transparency instructions that, when executed, cause a plurality of variable transparency pixels inside the local display region to operate at a partially transparent level.

6. The optical device of claim 5, wherein the transparency instructions, when executed, cause a plurality of variable transparency pixels inside and outside the local display region to operate at a partially transparent level.

7. The optical device of claim 2 further including:

transparency instructions that, when executed, cause a plurality of variable transparency pixels inside the local display region to operate at a transparency level different from variable transparency pixels outside the local display region.

8. The optical device of claim 2 further including:

non-transparency instructions that, when executed, cause a plurality of variable transparency pixels inside the local display region to operate at a non-transparent level.

9. The optical device of claim 8, wherein the non-transparency instructions, when executed, cause a plurality of variable transparency pixels inside and outside the local display region to operate at a non-transparent level.

10. The optical device of claim 1, wherein the index of refraction instructions, when executed, can select individual indices of refraction for first and second lens pixels within the variable lens layer such that the index of refraction selected for the first lens pixel is at least five percent greater than the index of refraction selected for the second lens pixels.

11. The optical device of claim 1, wherein the transparency instructions, when executed, can select individual partial transparency levels for first and second variable transparency pixels within the variable lens layer such that the transparency level selected for the first variable transparency pixel is at least five percent greater than the transparency level selected for the second variable transparency pixels.

12. The optical device of claim 1 further including:

a control circuit and a non-transitory computer readable medium operably coupled thereto, the non-transitory computer readable medium comprising a plurality of instructions stored in association therewith that are accessible to, and executable by, the control circuit, where the plurality of instructions comprises:

display instructions that, when executed, cause a plurality of display pixels within a local display region within the image display layer to emit light representing an image;

index of refraction instructions that, when executed, select individual indexes of refraction for individual lens pixels of a plurality of lens pixels within a local lens region, to impart to light incident thereupon, emitted by one or more of the display pixels within the local display region, to focus the image at a focal plane; and transparency instructions that, when executed, cause a plurality of variable transparency pixels inside the local display region to operate at a transparency level different from variable transparency pixels outside the local display region.

13. The optical device of claim 1, wherein the plurality of variable transparency pixels includes at least one of variable transparency liquid crystal display (LCD) devices or organic light-emitting diode (OLED) devices.

14. The optical device of claim 1, wherein the plurality of display pixels includes at least one of electroluminescent (EL) devices, vacuum fluorescent devices, plasma display panel devices, LCD devices, thin film transistor (TFT) LCD devices, OLED devices and Liquid Crystal on Silicon (LCoS) devices.

15. The optical device of claim 1, wherein the plurality of variable lens pixels includes at least one of LCD devices or TFT LCD devices.

* * * * *